(12) United States Patent
Morales Arnaez (10) Patent No.: US 7,918,439 B2
(45) Date of Patent: Apr. 5, 2011

(54) SILENTBLOCK DEVICE, MANUFACTURING PROCESS AND APPARATUS

(75) Inventor: Agustin Morales Arnaez, Getxo (ES)

(73) Assignee: Industria Auxiliar Alavesa, S.A. (INAUXA S.A.), Amurrio, Alara (ES)

( * ) Notice: Subject to any disclaimer, the term of this patent is extended or adjusted under 35 U.S.C. 154(b) by 593 days.

(21) Appl. No.: 11/760,605

(22) Filed: Jun. 8, 2007

(65) Prior Publication Data

US 2008/0222841 A1   Sep. 18, 2008

(30) Foreign Application Priority Data

Jun. 8, 2006   (EP) ..................................... 06380155

(51) Int. Cl.
*F16F 7/00*   (2006.01)
(52) U.S. Cl. .................. 267/141.3; 267/141.4
(58) Field of Classification Search .................. 267/141, 267/141.1–141.5; 280/124.109
See application file for complete search history.

(56) References Cited

U.S. PATENT DOCUMENTS

| | | | |
|---|---|---|---|
| 1,729,328 A | | 9/1929 | Chilton |
| 2,720,374 A | * | 10/1955 | Hutton ........................ 267/141.4 |
| 2,749,160 A | | 6/1959 | Cowles |
| 3,437,301 A | * | 4/1969 | Brake et al. ................. 267/141.4 |
| 5,941,511 A | * | 8/1999 | Dawda et al. ............ 267/140.12 |
| 6,666,438 B2 | * | 12/2003 | Nakagawa ................. 267/141.2 |
| 6,767,020 B2 | * | 7/2004 | Yamamoto et al. .... 280/124.109 |

FOREIGN PATENT DOCUMENTS

| | | |
|---|---|---|
| DE | 31 38 534 | 6/1982 |
| EP | 0 496 044 | 3/1994 |
| EP | 1 346 809 | 9/2003 |
| JP | 11-108093 | 4/1999 |

* cited by examiner

*Primary Examiner* — Melanie Torres Williams
(74) *Attorney, Agent, or Firm* — Merchant & Gould P.C.

(57) ABSTRACT

The invention relates to a device, a process and an apparatus for manufacturing a silentblock device having a silentblock (4), a seating (2), a shock absorber (3) and a casing (1) having first joining means (120) between the casing (1) and the seating (2) formed by a frusto-conical portion (121) in each end of the casing (1) and a conjugated frusto-conical portion (122) in each end of the seating (2) to clamp the seating (2) to the casing (1). The apparatus has: containment devices (100) for defining a cavity (110) between the surface to be over-injected and the containment devices (100); entrance devices (200) in the containment devices (100), so that the over-injection product can be introduced in the cavity (110).

25 Claims, 5 Drawing Sheets

SILENTBLOCK DEVICE, MANUFACTURING PROCESS AND APPARATUS

FIELD OF THE INVENTION

The invention relates to a silentblock device of the type used in automation, to the manufacturing process of said silentblock as well as the apparatus wherein the device is manufactured according to the process.

BACKGROUND OF THE INVENTION

Various embodiments describing the silentblock devices are known in the state of the art.

Nevertheless, the embodiments proposed in the state of the art require a precise adjustment both in the manufacture and in the later assembly of the components of the device. This high degree of precision in the manufacture is necessary because it could even happen that the assembly is not possible if the tolerances of the components are too wide or if, even in the event that they are more restrictive, the manufactured pieces do not comply with said design tolerances; these tolerances will also have a repercussion in the performance of the device.

The silentblock devices with unsuitable tolerances cause a series of inadmissible defects. These defects, in addition to being observable in a recently manufactured device, entail a premature deterioration of the device, shorten its working life and affect the use of the device.

Another feature that the silentblock devices must have is tightness. The tightness must be assured through the adjustment of the components themselves of the silentblock, the design and manufacture tolerances of said components yet again being important.

Another additional feature which the silentblock devices must have is modularity, this being understood as the ability to form a module which is integrated in a system of which said silentblock device forms part. The devices known in the state of the art have a design and construction which do not facilitate this ability to be integrated in a system in a manner that can be easily adapted to different systems because they require the system itself to be modified for this.

SUMMARY OF THE INVENTION

The present invention proposes a silentblock device, a process for manufacturing said silentblock and an apparatus wherein the silentblock is manufactured by said process solving the drawbacks present in the state of the art set forth previously.

The design of the joining means and the areas in contact of the components of the silentblock device in the joining surfaces assure the tightness required in this type of devices. Said joining means also allow simplifying the manufacturing process of the device because the dispersions in the contact areas are absorbed by the configuration itself of said means; the flaring or tapering in the contact areas between the ends of the casing and the outer silentblock seating or bushing.

The relation between the casing and the seating also allows the casing to be designed such that it can be adapted to different applications according to the silentblock device to be incorporated.

The present invention also relates to the manufacturing process of a joining and stress-transmitting element or link or compass including the present silentblock device. The joining elements manufactured according to present invention, the material forming the arm or link is over-injected on the previously manufactured silentblock device, in contrast to the usual manufacturing practice, wherein the arm or link is formed first and afterwards a silentblock device or other component is coupled to the ends of the arm.

The shape of the ends of the seating or outer bushing of the device, provided with several flares or tapers, allow a series of advantages over conventional silentblock devices: once the silentblock device has been over-injected to form part of a joining or stress-transmitting element or link or compass, said silentblock device is perfectly clamped inside the link or compass assembly because the flared ends have a flange effect, allowing the silentblock device to work under all types of stresses: axial, gimbal, conical, whereas conventional silentblocks have limitations for supporting this type of stresses, especially axial stresses.

The device of the invention also allows any type of material for the over-injection as long as said material is compatible, or does not damage the shock absorber or elastic element arranged between the inner silentblock or bushing and the outer seating or bushing due to the features of said elastic element of resistance to heat, adhesives, glues, melting point, corrosion.

According to a first aspect, the invention describes a silentblock device comprising:
 a substantially cylindrical inner silentblock or bushing;
 an outer silentblock seating or bushing comprising:
  a seating housing for housing the inner silentblock or bushing, said seating housing being configured to allow a pivoting movement of the silentblock in said seating housing, this pivoting movement being limited by the elasticity allowed by the rubber joint between the inner silentblock or bushing and the outer silentblock seating or bushing;
  a seating opening in each end of the outer seating or bushing configured to allow introducing the inner silentblock or bushing in said seating housing;
 a shock absorber between the inner silentblock or bushing and the outer seating or bushing to limit the pivoting movement between the inner silentblock or bushing and the outer seating or bushing;
 a substantially cylindrical casing comprising:
  a casing housing for housing the outer seating or bushing, said casing housing being configured to avoid the relative movement between the casing and the outer seating or bushing;
  a casing opening in each end of the casing configured to allow introducing the outer seating or bushing in the casing housing;
characterized in that:
 the casing comprises:
  first joining means between the casing and the outer seating or bushing formed by a frusto-conical portion in each end of the casing and a frusto-conical portion conjugated in each end of the outer seating or bushing to clamp the outer seating or bushing to the casing.

In the device of the invention, the outer seating or bushing can comprise:
 second joining means between the outer seating or bushing and the shock absorber formed by a second frusto-conical portion in each end of the outer seating or bushing and a second frusto-conical portion conjugated in each end of the shock absorber to clamp the shock absorber to the outer seating or bushing.

The shock absorber can comprise an annular groove in each end of the shock absorber so that the shock absorber has a lower resistance to the pivoting movement for small pivot angles. The shock absorber is a component of the device having the resilience and elasticity properties necessary to comply with its function inside the assembly.

In the device of the invention:
the casing can have an inner surface comprising the casing portion and the first frusto-conical portion;
the seating can have a conjugated outer surface comprising the first seating portion and the first conjugated frusto-conical portion;
the inner surface and the outer surface can have a guiding in each end of the casing and of the seating for generating an inner peripheral surface and a conjugated outer peripheral surface selected from circular, polygonal and curved.

The device of the invention can have a thickness H and the frusto-conical portions can have a height d, d being ≦0.3 H.

In the device of the invention, the casing can be of a material selected from: thermoplastic material, thermosetting plastic, composite material of plastic matrix; molten ferric material; wrought ferric material; welded ferric material; aluminium; magnesium; and combinations thereof.

The casing can comprise a body formed by a plurality of pieces.

In the device of the invention, the outer silentblock seating or bushing can be of a material selected from: thermoplastic material, thermosetting material; alloyed cast iron; bronze; sintered material; aluminium; magnesium; and combinations thereof.

In the device of the invention, the casing and the outer silentblock seating or bushing can be joined by means of a process selected from welding, riveting, over-injection and combinations thereof.

On the other hand, the shock absorber can be an elastomeric material selected from: natural rubber; synthetic rubber; injectable polyurethane; and combinations thereof.

A second aspect of the invention refers to the process for manufacturing the previously described device
by means of an apparatus for over-injecting on an outer surface to be over-injected of a seating containing a shock absorber and a silentblock, an over-injection product in order to obtain a silentblock device.

Said apparatus can comprise:
containment means configured to define a cavity between the surface to be over-injected and said contention means;
entrance means located in the containment means, for introducing the over-injection product in the cavity;
whereas the process can comprise the following steps:
i) forming a first conjugated frusto-conical portion in each end of the seating;
ii) placing the seating containing the shock absorber and the silentblock in a first mould;
iii) displacing the first mould and a second mould to an over-injection position in which the two moulds form the containment means and define a cavity wherein an over-injection product is over-injected to form the silentblock device of plastic material on the seating containing the shock absorber and the silentblock;
iv) displacing the first mould and the second mould to a demoulding position in which the silentblock device is removed.

The process can further comprise a prior step i0) for forming a conjugated outer surface of the seating defined by a guiding in each end of the seating, to increase the turning torque between the seating and the over-injected casing. In other words, the conjugated outer surface can be either cylindrical, prismatic or follow an outline defined by several curved bases.

The process of the invention can further comprise, in the over-injection position, the steps:
a) generating a vacuum in the cavity through connecting means by vacuum-generating means;
b) introducing the over-injection product in the cavity through entrance means by introduction means;
c) generating overpressure in the cavity through connecting means by overpressure-generating means in order to obtain a silentblock device.

A third aspect of the invention refers to an apparatus for manufacturing the device by means of the process previously described, wherein said apparatus further comprises coupling means for:
coupling the containment means to the surface to be over-injected;
assuring tightness between the containment means and the surface to be over-injected, adapting the shape of the containment means to the surface to be over-injected.

BRIEF DESCRIPTION OF THE DRAWINGS

A series of drawings will be briefly described below which will aid in better understanding the invention and which are expressly related with an embodiment of said invention set forth as a non-limiting example of the same.

DETAILED DESCRIPTION OF THE PREFERRED EMBODIMENT(S)

Figure 1:
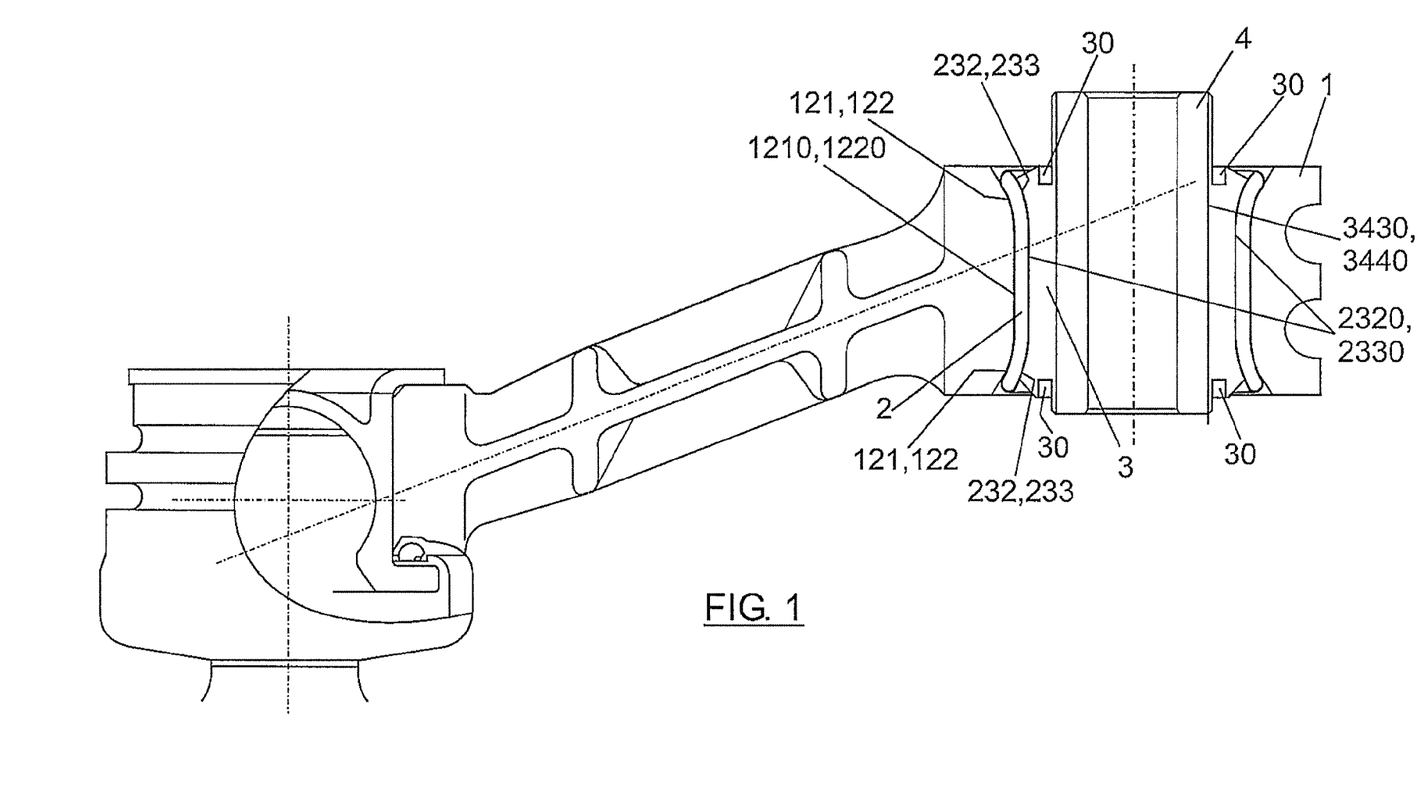
FIG. 1 is a sectional view of the device of the invention showing the different assembled components.
Figures 2, 3, 4:
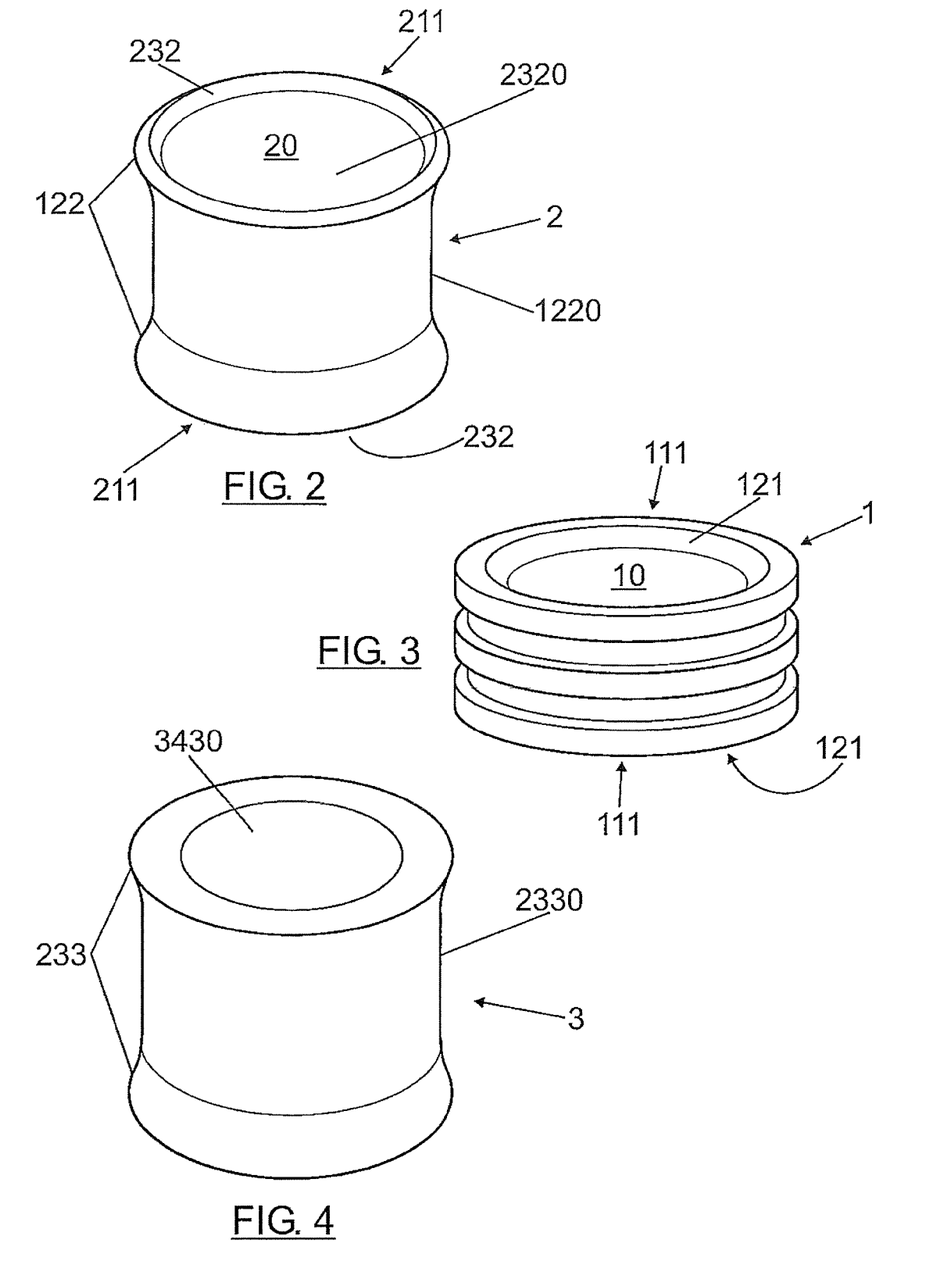
FIG. 2 is a perspective view of the outer seating or bushing.
FIG. 3 is a perspective view of the casing.
FIG. 4 is a perspective view of the shock absorber.

A preferred embodiment of the invention is described below with the help of drawings. Thus, according to the embodiment, the silentblock device can comprise:
a substantially cylindrical inner silentblock or bushing 4;
an outer silentblock seating or bushing 2 that can comprise:
a seating housing 20 for housing the inner silentblock or bushing 4, said seating housing 20 being configured to allow a pivoting movement of the inner silentblock or bushing 4 in said seating housing 20;
a seating opening 211 in each end of the seating configured to allow introducing the inner silentblock or bushing 4 in said seating housing 20;
a shock absorber 3 between the inner silentblock or bushing 4 and the outer seating or bushing 2 to limit the pivoting movement between the inner silentblock or bushing 4 and the outer seating or bushing 2;
a substantially cylindrical casing 1 comprising:
a casing housing 10 for housing the outer seating or bushing 2, said casing housing 10 being configured to prevent the relative movement between the casing 1 and the outer seating or bushing 2;

a casing opening 111 in each end of the casing configured to allow introducing the outer seating or bushing 2 in the casing housing 10;

characterized in that the casing 1 and the outer seating or bushing 2 can comprise:

first joining means between the casing 1 and the outer seating or bushing 2 to clamp the outer seating or bushing 2 to the casing 1, said first joining means being able to comprise:

a first frusto-conical portion 121 having an inner outline in each end of the casing 1, said first frusto-conical portion 121 converging from each end of the casing 1 towards the casing housing 10, that is, forming a first concave frusto-conical portion 121;

a first conjugated frusto-conical portion 122 having an outer outline in each end of the outer seating or bushing 2, said first conjugated frusto-conical portion 122 converging from each end of the seating 2, that is, forming a first conjugated convex frusto-conical portion 122, said first conjugated convex frusto-conical portion 122 being configured to be coupled to the first concave frusto-conical portion 121 since the first outer outline fits in the first inner outline.

In the embodiments of the invention, the outer seating or bushing 2 and the shock absorber 3 can comprise:

second joining means between the outer seating or bushing 2 and the shock absorber 3 to clamp the shock absorber 3 to the outer seating or bushing 2, said second joining means being able to comprise:

a second frusto-conical portion 232 having an inner outline in each end of the outer seating or bushing 2, said second frusto-conical portion 232 converging from each end of the seating 2 towards the seating housing 20, that is, forming a second concave frusto-conical portion 232;

a second conjugated frusto-conical portion 233 having an outer outline in each end of the shock absorber 3, said second conjugated frusto-conical portion 233 converging from each end of the shock absorber 3, that is, forming a second conjugated convex frusto-conical portion 233, said second conjugated convex frusto-conical portion 233 being configured to be coupled to a the second concave frusto-conical portion 232 since the second outer outline fits in the second inner outline.

In the embodiments of the invention, the casing 1 and the outer seating or bushing 2 can comprise:

first adjusting means between the casing 1 and the outer seating or bushing 2 formed by:

a casing portion 1210 between the ends of the casing 1 having a third inner outline;

a first seating portion 1220 between the ends of the seating 2 having a third conjugated outer outline;

configured so that the seating 2 is tightly coupled to the casing 1 since the third conjugated outer outline fits in the third inner outline.

In the embodiments of the invention, the outer seating or bushing 2 and the shock absorber 3 can comprise:

second adjusting means between the outer seating or bushing 2 and the shock absorber 3 formed by:

a second seating portion 2320 between the ends of the seating 2 having a fourth inner outline;

a first shock absorber portion 2330 between the ends of the shock absorber 3 having a fourth conjugated outer outline;

configured so that the shock absorber 3 is tightly coupled to the outer seating or bushing 2 since the fourth conjugated outer outline fits in the fourth inner outline.

In the embodiments of the invention, the shock absorber 3 and the inner silentblock or bushing 4 can comprise:

third adjusting means between the shock absorber 3 and the inner silentblock or bushing 4 formed by:

a second shock absorber portion 3430 between the ends of the shock absorber 3 having a fifth inner outline;

a silentblock portion 3440 between the ends of the silentblock 4 having a fifth conjugated outer outline;

configured so that the silentblock 4 is tightly coupled to the shock absorber 3 since the fifth conjugated outer outline fits in the fifth inner outline.

According to an embodiment of the invention, the third outlines, the fourth outlines and the fifth outlines can have a circular cross-section. Both in the case of the circular outlines and of other geometries, for example, square or in a ribbed tree shape, the dimensions and tolerances of the corresponding inner and outer conjugated outlines are determined to allow a tightening adjustment between the components of the device.

In the embodiments of the invention, the shock absorber 3 can comprise an annular groove 30 in each end of the shock absorber 3 so that the shock absorber 3 has a lower resistance to the pivoting movement for small pivot angles.

In the device of the invention:

the casing 1 can have an inner surface comprising the casing portion 1210 and the first frusto-conical portion 121;

the seating 2 can have a conjugated outer surface comprising the first seating portion 1220 and the first conjugated frusto-conical portion 122;

the inner surface and the conjugated outer surface can have a guiding in each end of the casing 1 and of the seating 2 to generate an inner peripheral surface and a conjugated outer peripheral surface selected from circular, polygonal and curved.

The device of the invention can have a thickness H and the frusto-conical portions 121, 122, 232, 233 can have a height d, d being $\leq 0.3$ H.

In the embodiments of the invention, the casing 1 can be of a material selected from:

thermoplastic plastic;
thermosetting plastic;
composite material of plastic matrix;
molten ferric material;
wrought ferric material;
welded ferric material;
aluminium;
magnesium;
and combinations thereof.

In the embodiments of the invention, the casing 1 can comprise a body formed by a plurality of pieces.

In the embodiments of the invention, the seating 2 of outer silentblock or bushing can be of a material selected from:

thermoplastic plastic;
thermosetting plastic;
alloyed cast iron;
bronze;
sintered material;
aluminium;
magnesium;
and combinations thereof.

In the embodiments of the invention, the casing 1 and the silentblock seating 2 are joined by means of a process selected from welding, riveting, over-injection and combinations thereof.

In the embodiments of the invention, the shock absorber 3 can be of an elastomeric material selected from:
natural rubber;
synthetic rubber;
plastic;
injectable polyurethane;
and combinations thereof.

A second aspect of the invention refers to a process for manufacturing the previously described device
by means of an apparatus for over-injecting on an outer surface to be over-injected of a seating 2 containing a shock absorber 3 and a silentblock 4, an over-injection product in order to obtain a silentblock device.

Figure 5A:
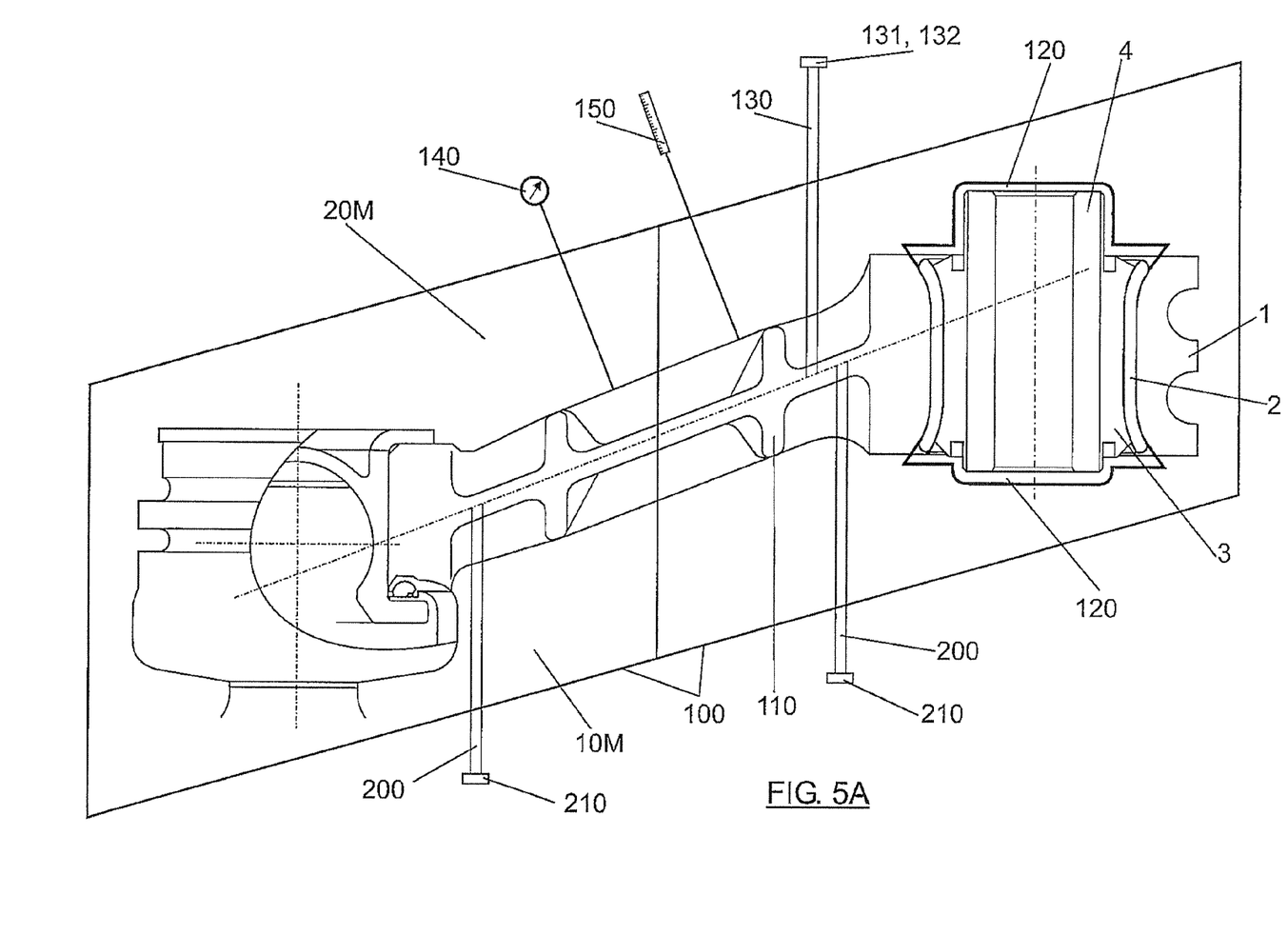
FIG. 5A is an elevational sectional view of the apparatus of the invention, in which the coupling means are wrought in the inner shape of the mould, showing the silentblock device of the invention.
Figure 5B:
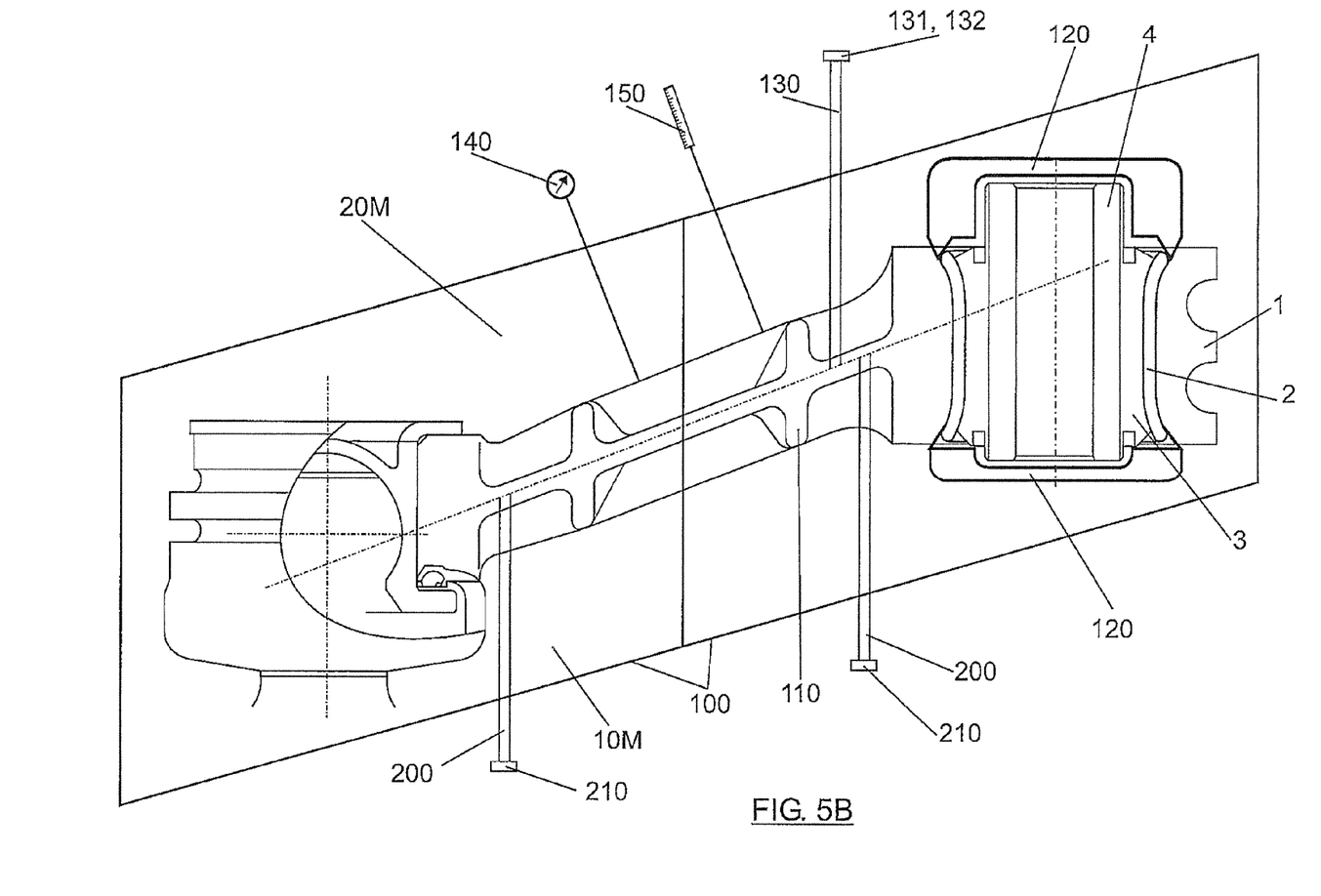
FIG. 5B is an elevational sectional view of the apparatus of the invention, in which the coupling means are an additional edge piece or element configured to be adapted on one hand to the shape of the silentblock and on the other hand to the mould, showing the silentblock device of the invention.

Said apparatus can comprise:
containment means 100 configured to define a cavity 110 between the surface to be over-injected and said containment means 100;
entrance means 200 located in the containment means 100, so that the over-injection product can be introduced in the cavity 110;

whereas the process can comprise the steps:
i) forming a first conjugated frusto-conical portion 122 in each end of the seating 2;
ii) placing the seating 2 containing the shock absorber 3 and the silentblock 4 in a first mould 10M;
iii) displacing the first mould 10M and a second mould 20M to an over-injection position in which the two moulds 10M, 20M form the containment means 100 and define a cavity 110 wherein the over-injection product is over-injected to form the silentblock device of plastic material on the seating 2 containing the shock absorber 3 and the silentblock 4;
iv) displacing the first mould 10M and the second mould 20M to a demoulding position in which the silentblock device is removed.

In an embodiment of the invention, the first mould 10M is a lower mould and the mould 20M is an upper mould. Each mould 10M, 20M can in turn be formed by several pieces: in the over-injection position, the pieces form each mould 10M, 20M, whereas in the demoulding position, the pieces are separated to facilitate the demoulding. In a preferred embodiment, each mould 10M, 20M can comprise two halves.

Figure 6:
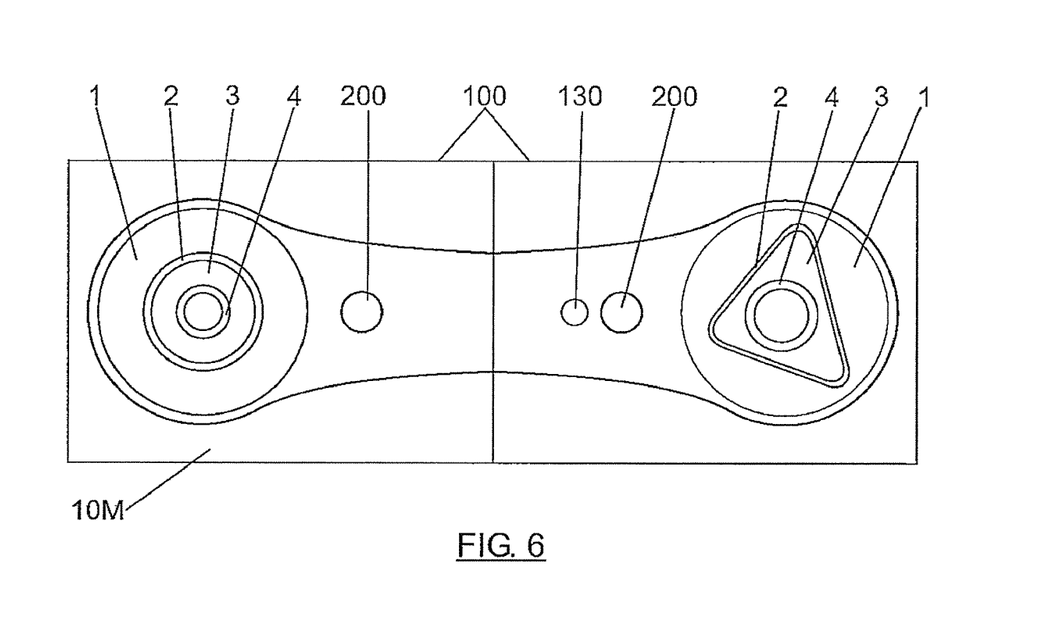
FIG. 6 is a plan view of the apparatus of the invention showing the silentblock device of the invention.

The process can further comprise a prior step i0) for forming a conjugated outer surface of the seating 2 defined by a guiding in each end of the seating 2, to increase the turning torque between the seating 2 and the over-injected casing 1. In other words, the conjugated outer surface can be either cylindrical, prismatic or follow an outline defined by several curved bases. These different shapes of the seating 2 are shown in FIG. 6 in which a cylindrical silentblock device and a triangular silentblock device can be observed.

The process of the invention can further comprise, in the over-injection position, the steps:
a) generating a vacuum in the cavity 110 through connecting means 130 by vacuum-generating means 131;
b) introducing the over-injection product in the cavity 110 through entrance means 200 by introduction means 210;
c) generating overpressure in the cavity 110 through connecting means 130 by overpressure-generating means 132 in order to obtain a silentblock device.

The vacuum-generating step a) can comprise:
a1) reaching a first pressure P1 comprised between 2500 Pa and 25 kPa in the cavity 110 for a first time t1 comprised between 1 s and 120 s;
a2) ending step a) con with a second pressure P2 comprised between 2500 Pa and 25 kPa in the cavity 110 for a second time t2 comprised between 1 s and 120 s.

The process of the invention can further comprise a prior sub-step a0) for reaching a prior temperature T0 comprised between 20° C. and 120° C. in the outer surface to be over-injected.

The step b) of over-injection material introduction can comprise:
b1) introducing said material in the cavity which is at a first temperature T1 comprised between 100° C. and 400° C. for a third time t3 comprised between 1 s and 120 s;
b2) ending step b) with a third pressure P3 comprised between 2 MPa and 100 MPa in the cavity 110 for a fourth time t4 comprised between 1 s and 120 s.

The step c) of overpressure generation can comprise:
c1) starting with a fourth pressure P4 comprised between 2 MPa and 100 MPa in the cavity 110 for a fifth time t5 comprised between 1 s and 120 s;
c2) ending step c) with a fifth pressure P5 comprised between 2 MPa and 100 MPa in the cavity 110.

The process of the invention can further comprise previously drying the surface to be over-injected.

The previous drying step can comprise reaching a drying temperature comprised between 20° C. and 150° C. in the surface to be over-injected for a drying time t'0 comprised between 1 s and 120 s.

The process of the invention can also comprise subsequently curing the over-injected surface.

The curing step can comprise reaching a subsequent temperature Tn comprised between 20° C. and 150° C. in the over-injected surface for a subsequent time comprised between 1 s and 120 s.

A third aspect of the invention refers to an apparatus for manufacturing the device by means of the previously described process wherein said apparatus further comprises coupling means 120 for:
coupling the containment means 100 to the surface to be over-injected;
assuring tightness between the containment means 100 and the surface to be over-injected; adapting the shape of the containment means 100 to the surface to be over-injected.

The apparatus can further comprise connecting means 130 located in the containment means 100, to allow generating a pressure selected from vacuum pressure and overpressure in the cavity 110.

Additionally, the apparatus can further comprise:
pressure measuring means 140 located in the containment means 100, for measuring the pressure in the cavity 110;
temperature measuring means 150 located in the containment means 100, for measuring the temperature in the cavity 110.

On the other hand, the apparatus can also comprise:
introduction means 210 for introducing the over-injection product in the cavity 110 through the entrance means 200;

Optionally, the apparatus can also comprise:
vacuum-generating means 131 for generating a vacuum pressure in the cavity 110 through the connecting means 130;
overpressure-generating means 132 for generating an overpressure in the cavity 110 through the connecting means 130.

The invention claimed is:

1. A silentblock device comprising:
a substantially cylindrical silentblock;
a silentblock seating comprising:
   a seating housing for housing the silentblock, said seating housing being configured to allow a pivoting movement of the silentblock in said seating housing;
   a seating opening in each end of the seating configured to allow introducing the silentblock in said seating housing;
a shock absorber between the silentblock and the seating to limit the pivoting movement between the silentblock and the seating;
a substantially cylindrical casing of plastic material over-injected onto an outer surface of the silentblock seating containing the shock absorber and the silentblock, the cylindrical casing comprising:
   a casing housing for housing the seating, said casing housing being configured to prevent the relative movement between the casing and the seating;
   a casing opening in each end of the casing configured to allow introducing the seating in the casing housing;
wherein the casing and the seating comprise:
first joining means between the casing and the seating to clamp the seating to the casing, said first joining means comprising:
   a first frusto-conical portion having an inner outline in each end of the casing, said first frusto-conical portion converging from each end of the casing towards the casing housing to form a first concave frusto-conical portion;
   a first conjugated frusto-conical portion having a first outer outline in each end of the seating, said first conjugated frusto-conical portion converging from each end of the seating to form a first conjugated convex frusto-conical portion, said first conjugated convex frusto-conical portion being configured to be coupled to the first concave frusto-conical portion since the first outer outline fits in the first inner outline.

2. The device of claim 1 wherein the seating and the shock absorber comprise:
second joining means between the seating and the shock absorber to clamp the shock absorber to the seating, said second joining means comprising:
   a second frusto-conical portion having a second inner outline in each end of the seating, said second frusto-conical portion converging from each end of the seating towards the seating housing to form a second concave frusto-conical portion;
   a second conjugated frusto-conical portion having a second outer outline in each end of the shock absorber, said second conjugated frusto-conical portion converging from each end of the shock absorber to form a second conjugated convex frusto-conical portion, said second conjugated convex frusto-conical portion being configured to be coupled to the second concave frusto-conical portion since the second outer outline fits in the second inner outline.

3. The device of claim 1 wherein the casing and the seating comprise:
first adjusting means between the casing and the seating comprising:
   a casing portion between the ends of the casing having a third inner outline;
   a first seating portion between the ends of the seating having a third conjugated outer outline;
   configured so that the seating is tightly coupled to the casing since the third conjugated outer outline fits in the third inner outline.

4. The device of claim 1 wherein the seating and the shock absorber comprise:
second adjusting means between the seating and the shock absorber comprising:
   a second seating portion between the ends of the seating having a fourth inner outline;
   a first shock absorber portion between the ends of the shock absorber having a fourth conjugated outer outline;
   configured so that the shock absorber is tightly coupled to the seating since the fourth conjugated outer outline fits in the fourth inner outline.

5. The device of claim 1 wherein the shock absorber and the inner silentblock or bushing comprise:
third adjusting means between the shock absorber and the inner silentblock or bushing comprising:
   a second shock absorber portion between the ends of the shock absorber having a fifth inner outline;
   a silentblock portion between the ends of the silentblock having a fifth conjugated outer outline;
   configured so that the silentblock is tightly coupled to the shock absorber since the fifth conjugated outer outline fits in the fifth inner outline.

6. The device of claim 1 wherein the shock absorber comprises an annular groove in each end of the shock absorber so that the shock absorber has a lower resistance to the pivoting movement for small pivot angles.

7. The device of claim 3 wherein:
the casing has an inner surface comprising the casing portion and the first frusto-conical portion;
the seating has a conjugated outer surface comprising the first seating portion and the first conjugated frusto-conical portion;
the inner surface and the conjugated outer surface can have a guiding in each end of the casing and of the seating to generate an inner peripheral surface and a conjugated outer peripheral surface selected from circular, polygonal and curved.

8. The device of claim 1 having a thickness H wherein the frusto-conical portions have a height d, d being $\leq 0.3H$.

9. The device of claim 1 wherein the casing comprises a body formed by a plurality of pieces and is of a material selected from at least one of the following:
thermoplastic plastic;
thermosetting plastic;
composite material of plastic matrix;
molten ferric material;
wrought ferric material;
welded ferric material;
aluminium;
magnesium.

10. The device of claim 1 wherein the casing and the silentblock seating are joined by means of a process selected from welding, riveting, over-injection and combinations thereof and the silentblock seating is of a material selected from at least one of the following:
thermoplastic plastic;
thermosetting plastic;
alloyed cast iron;
bronze;
sintered material;
aluminium;
magnesium.

11. The device of claim 1 wherein the shock absorber can be of an elastomeric material selected from at least one of the following:
natural rubber;
synthetic rubber;
plastic;
injectable polyurethane.

12. A process for manufacturing by over-injection the device of claim 1 by means of an apparatus for over-injecting on an outer surface to be over-injected of a seating containing a shock absorber and a silentblock, an over-injection product in order to obtain a silentblock device, said apparatus comprising:
containment means configured to define a cavity between the surface to be over-injected and said containment means;
entrance means located in the containment means, so that the over-injection product can be introduced in the cavity;
said process wherein it comprises the steps of:
i) forming a first conjugated frusto-conical portion in each end of the seating;
ii) placing the seating containing the shock absorber and the silentblock in a first mould;
iii) displacing the first mould and a second mould to an over-injection position in which the two moulds form the containment means and define a cavity wherein the over-injection product is over-injected to form the silentblock device of plastic material on the seating containing the shock absorber and the silentblock;
iv) displacing the first mould and the second mould to a demoulding position in which the silentblock device is removed.

13. The process of claim 12 which further comprises a prior step for forming a conjugated outer surface of the seating defined by a guiding in each end of the seating, to increase the turning torque between the seating and the over-injected casing.

14. The process of claim 12 wherein the over-injection position further comprises the steps of:
a) generating a vacuum in the cavity through connecting means by vacuum-generating means;
b) introducing the over-injection product in the cavity through entrance means by introduction means;
c) generating overpressure in the cavity through connecting means by overpressure-generating means in order to obtain a silentblock device.

15. The process of claim 14 wherein the vacuum-generating step a) comprises:
a1) reaching a first pressure $P1$ comprised between 2500 Pa and 25 kPa in the cavity for a first time $t1$ comprised between 1 s and 120 s;
a2) ending step a) con with a second pressure $P2$ comprised between 2500 Pa and 25 kPa in the cavity for a second time $t2$ comprised between 1 s and 120 s.

16. The process of claim 14 wherein it further comprises a prior sub-step a0) for reaching a prior temperature $T0$ comprised between 20° C. and 120° C. in the outer surface to be over-injected.

17. The process of claim 14 wherein the step b) of over-injection material introduction comprises:
b1) introducing said material in the cavity which is at a first temperature $T1$ comprised between 100° C. and 400° C. for a third time $t3$ comprised between 1 s and 120 s;
b2) ending step b) with a third pressure $P3$ comprised between 2 MPa and 100 MPa in the cavity for a fourth time $t4$ comprised between 1 s and 120 s.

18. The process of claim 14 wherein the step c) of overpressure generation comprises:

c1) starting with a fourth pressure $P4$ comprised between 2 MPa and 100 Mpa in the cavity for a fifth time $t5$ comprised between 1 s and 120 s;
c2) ending step c) with a fifth pressure $P5$ comprised between 2 MPa and 100 MPa in the cavity.

19. The process of claim 14 wherein it further comprises previously drying the surface to be over-injected and the drying step comprises reaching a drying temperature comprised between 20° C. and 150° C. in the surface to be over-injected for a drying time $t'0$ comprised between 1 s and 120 s.

20. The process of claim 14 wherein it further comprises subsequently curing the over-injected surface and the curing step comprises reaching a subsequent temperature $Tn$ comprised between 20° C. and 150° C. in the over-injected surface for a subsequent time comprised between 1 s and 120 s.

21. An apparatus for manufacturing the device of claim 1 by over-injecting on an outer surface to be over-injected of a seating containing a shock absorber and a silentblock, said apparatus comprising:
containment means configured to define a cavity between the surface to be over-injected and said containment means;
entrance means located in the containment means, so that the over-injection product can be introduced in the cavity;
said process wherein it comprises the steps of:
i) forming a first conjugated frusto-conical portion in each end of the seating;
ii) placing the seating containing the shock absorber and the silentblock in a first mould;
iii) displacing the first mould and a second mould to an over-injection position in which the two moulds form the containment means and define a cavity wherein the over-injection product is over-injected to form the silentblock device of plastic material on the seating containing the shock absorber and the silentblock;
iv) displacing the first mould and the second mould to a demoulding position in which the silentblock device is removed;
wherein said apparatus further comprises coupling means for:
coupling the containment means to the surface to be over-injected;
assuring tightness between the containment means and the surface to be over-injected;
adapting the shape of the containment means to the surface to be over-injected.

22. The apparatus of claim 21 further comprising connecting means located in the containment means, to allow a pressure selected from vacuum pressure and overpressure to be generated in the cavity.

23. The apparatus of claim 21 further comprising:
pressure measuring means located in the containment means, for measuring the pressure in the cavity;
temperature measuring means located in the containment means, for measuring the temperature in the cavity.

24. The apparatus of claim 21 further comprising:
introduction means for introducing the over-injection product in the cavity through the entrance means.

25. The apparatus of claim 21 further comprising:
vacuum-generating means for generating a vacuum pressure in the cavity through the connecting means;
overpressure-generating means for generating an overpressure in the cavity through the connecting means.

* * * * *